United States Patent [19]

Seybold et al.

[11] Patent Number: 4,845,223
[45] Date of Patent: Jul. 4, 1989

[54] FLUORESCENT ARYLOXY-SUBSTITUTED PERYLENE-3,4,9,10-TETRACARBOXYLIC ACID DIIMIDES

[75] Inventors: Guenther Seybold, Neuhofen; Andreas Stange, Mannheim, both of Fed. Rep. of Germany

[73] Assignee: BASF Aktiengesellschaft, Ludwigshafen, Fed. Rep. of Germany

[21] Appl. No.: 939,000

[22] Filed: Dec. 8, 1986

[30] Foreign Application Priority Data

Dec. 19, 1985 [DE] Fed. Rep. of Germany ........ 3545004

[51] Int. Cl.⁴ ............................................... C09B 5/62
[52] U.S. Cl. ...................................................... 546/37
[58] Field of Search ..................................... 546/37, 98

[56] References Cited

U.S. PATENT DOCUMENTS

| 4,110,123 | 8/1978 | Goetzberger et al. | 136/247 |
| 4,142,781 | 3/1979 | Baur et al. | 350/345 |
| 4,379,934 | 4/1983 | Graser et al. | 546/37 |
| 4,431,806 | 2/1984 | Spietschka et al. | 546/37 |

FOREIGN PATENT DOCUMENTS

| 2620115 | 11/1977 | Fed. Rep. of Germany . |
| 2629641 | 1/1978 | Fed. Rep. of Germany . |
| 3001857 | 7/1981 | Fed. Rep. of Germany . |
| 3235526 | 3/1984 | Fed. Rep. of Germany . |
| 0962019 | 6/1964 | United Kingdom . |

Primary Examiner—Donald G. Daus
Assistant Examiner—Andrew G. Rozycki

Attorney, Agent, or Firm—Oblon, Spivak, McClelland, Maier & Neustadt

[57] ABSTRACT

The novel compounds of the general formula

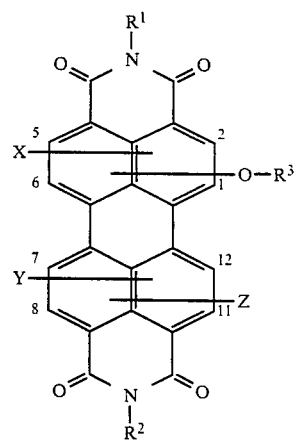

where
  $R^1$ and $R^2$ are identical or different aliphatic, cycloaliphatic, aromatic or heterocyclic radicals which are free of groups which impart water solubility,
  X, Y and Z are each chlorine, bromine or a radical $OR^3$ and
  $R^3$ is unsubstituted or substituted phenyl, naphthyl or anthryl,
are very useful as fluorescent dyes in organic material.

7 Claims, No Drawings

FLUORESCENT ARYLOXY-SUBSTITUTED PERYLENE-3,4,9,10-TETRACARBOXYLIC ACID DIIMIDES

Apparatuses in which visible light can be concentrated by fluorescent dyes incorporated into plastic are disclosed in, for example, German Laid-Open Application DOS 3,001,857, DOS 2,620,115 and DOS 2,554,226.

For converting light energy to electrical or thermal energy, the fluorescent compounds must have high lightfastness in order that the apparatuses, which generally consist of transparent plastics, may have a life which is sufficient for the particular application.

Moreover, it is particularly advantageous in the conversion of light to electrical energy if the compounds used possess good separation of absorption and emission bands in the medium used for the application. It is also advantageous if, individually or in combination with other fluorescent dyes, they absorb a very broad range of visible sunlight and emit this as fluorescent light.

Another decisive factor with regard to the efficiency in concentrating light is the solubility of the fluorescent dye in the medium used, for example in the polymer matrix. Each scattering particle leads to a disturbance in light transmission as a result of deflection of light in undesired directions.

It is an object of the present invention to provide compounds which are suitable for the conventional apparatuses for concentrating light and which have high fluorescence and good solubility in the medium used, coupled with good lightfastness and a broad absorption range.

We have found that this object is achieved, and that excellent results are obtained in the concentration of light over a particular area in plastic sheets or films, if perylene-3,4,9,10-tetracarboxylic acid diimides of the general formula (I)

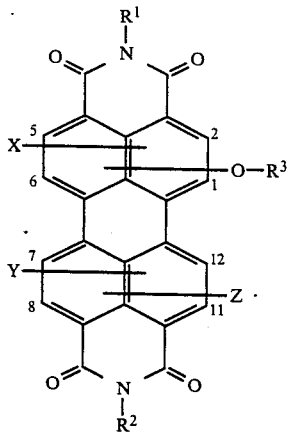

where
$R^1$ and $R^2$ are identical or different aliphatic, cycloaliphatic, aromatic or heterocyclic radicals which are free of groups which impart water solubility,
X, Y and Z are each chlorine, bromine or a radical $OR^3$ and
$R^3$ is unsubstituted or substituted phenyl, naphthyl or anthryl, are used.

Of particular importance are compounds of the formula (II)

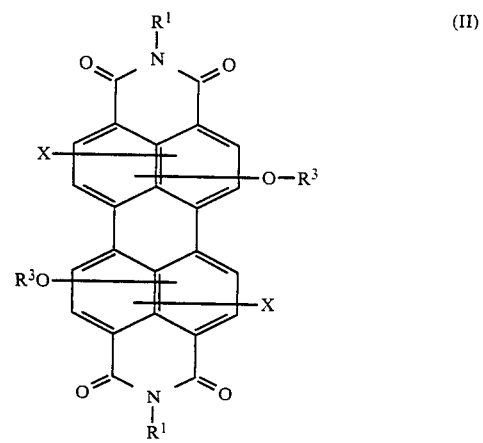

where
$R^1$ and $R^3$ have the meanings given and
X is chlorine or a radical $OR^3$.

Compounds in which X and $OR^3$ are in the 1, 6, 7 and 12 positions are particularly useful industrially.

Depending on the type and number of substituents, the compounds of the formulae (I) and (II) exhibit a bathochromic shift of the absorption and/or emission bands compared with the corresponding perylene-3,4,9,10-tetracarboxylic acid diimides which are not substituted in the perylene nucleus. The bathochromic shift is greater the greater the number of substituents $OR^3$ present. Thus, the maximum fluorescence can be set within a wavelength range of 550–630 nm, with the result that the fluorescent compounds (I) and (II) can be optimally adapted to the photovoltaic systems.

Surprisingly, novel compounds (I) and (II) also have absorption and emission bands which are very much broader than those of the compounds which are unsubstituted in the perylene nucleus.

Furthermore, in the materials conventionally used for concentrating light, the compounds of the formulae (I) and (II) are very lightfast and convert light to fluorescent light with high efficiency in a broad wavelength range.

The high thermal stability in the polymers conventionally used as media is also noteworthy. For example, colorations in polystyrene and polymethyl methacrylate are thermally stable up to 300° C. The novel compounds are also distinguished by very high solubility in the substrate and organic solvents, including liquid paraffin.

Suitable substituents $R^1$ and $R^2$, which may be identical or different, are aliphatic, cycloalphatic, aromatic or heterocyclic radicals. These radicals must not contain any groups which impart water solubility.

Examples of aliphatic radicals are $C_1$–$C_{18}$-alkyl which may be straight-chain or branched, interrupted by —O—, —S— or

and unsubstituted or substituted.

Examples of substituents are $C_1$–$C_{18}$-alkoxy, $C_1$–$C_{18}$-alkylthio, hydroxyl, alkanoyloxy, cycloaliphatic groups, heterocyclic groups, phenyl, phenoxy and/or phenylthio. Where more than one substituent is present, these substituents may be identical or different. The number of substituents on alkyl is preferably 0 or 1.

Suitable cycloaliphatic radicals $R^1$ and $R^2$ are those containing from 1 to 6 carbocyclic ring members, these radicals as a rule being of 4 to 30 carbon atoms. The cycloaliphatic radicals can, for example, be substituted by one or more of the following groups: hydroxyl, $C_1$–$C_5$-alkyl, methoxy, ethoxy, $C_1$- or $C_2$-alkylthio, $C_1$–$C_{18}$-alkanoyloxy or $C_1$–$C_8$-alkoxycarbonyl. The cycloaliphatic radicals are derived from, for example, cyclohexane, or Diels-Alder adducts of cyclopentadiene or cyclohexadiene as the diene and $C_2$–$C_{18}$-alkenes, cyclopentenes, cyclohexenes, unsubstituted or substituted enol-ethers or unsaturated carboxylic acids as the dienophilic component.

Examples of suitable aromatic and heterocyclic radicals $R^1$ and $R^2$ which do not contain any groups which impart water solubility are:

(a) radicals of the formula (III)

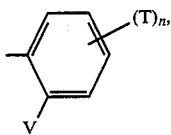

(III)

where
V is hydrogen, fluorine, chlorine, bromine, $C_1$–$C_8$-alkyl, preferably $C_1$–$C_4$-alkyl, phenyl or

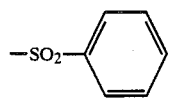

n is 0, 1 or 2,
T is fluorine, chlorine, bromine, $C_1$–$C_4$-alkyl, —NHCOR$^4$,

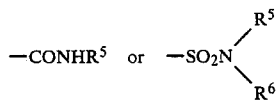

—CONHR$^5$ or —SO$_2$N $R^4$ is $C_1$–$C_4$-alkyl or phenyl,
$R^5$ is hydrogen, $C_1$–$C_4$-alkyl or phenyl,
$R^6$ is hydrogen or $C_1$–$C_4$-alkyl and
the radical

is a saturated 5-membered or 6-membered heterocyclic ring which may contain —O—, —S— or NR$^7$ as a ring member, R$^7$ being hydrogen or $C_1$–$C_4$-alkyl, n being 2 and
the substituents being identical or different.

The phenyl groups in T may be unsubstituted or substituted by fluorine, chlorine or bromine, the number of substituents being 1, 2 or 3, preferably 1 or 2.

(b) Radicals of the formula

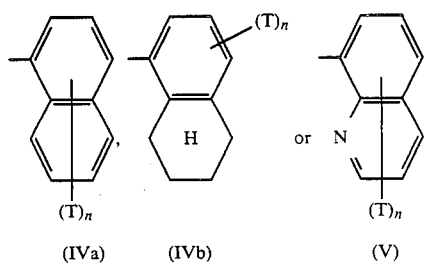

in which T and n have the meanings given above; pyrazol-5-yl radicals of the formula

(VI)

where $R^8$ is $C_1$–$C_{12}$-alkyl, furfur-2-yl, phenyl or $C_7$–$C_{10}$-phenalkyl, and the phenyl radicals may be unsubstituted or substituted by chlorine, bromine or $C_1$–$C_4$-alkyl, and the number of substituents is 1, 2 or 3, preferably 1 or 2, and $R^9$ is hydrogen or methyl.

(d) Benzisothiazol-3-yl of the formula

(VII)

Specific examples of $R^1$ and $R^2$ are:
1. unsubstituted or substituted alkyl:
 1.1 ethyl, n- or isopropyl, methyl, n-butyl, sec-butyl, isobutyl, pentyl, hexyl, 2,3-dimethylbutyl, neopentyl, heptyl, 2-methylhexyl, 3-methylhexyl, n- or isooctyl, 2-ethylhexyl, 6-methylhept-2-yl, 1- or 2-nonyl, 1- or 2-decyl, 2-methylnon-1-yl, 2-methylnon-2-yl, undecyl, dodecyl, tridecyl, tetradecyl, hexadecyl or octadecyl.
 1.2 Benzyl, 2-phenylethyl, 2- or 3-phenylpropyl, 3- or 4-phenylbutyl, phenylthioethyl, 2- or 3-phenylthiopropyl, 2-phenoxyethyl or 2- or 3-phenoxypropyl.
 1.3 —(CH$_2$CH$_2$O)$_p$—R$^{10}$ or —(CH$_2$)$_3$—(OCH$_2$—CH$_2$—)$_p$—OR$^{10}$, where R$^{10}$ is H, —CH$_3$, —C$_2$H$_5$, —CH(CH$_3$)$_2$ or —n—C$_4$H$_9$ and p is 1, 2, 3, 4 or 5, —(CH$_2$)$_3$—OR$^{11}$, where R$^{11}$ is C$_1$–C$_{13}$-alkyl, such as methyl, ethyl, n- or isopropyl, n- or isobutyl, pentyl, n-hexyl, n-octyl or 2-ethylhexyl, dodecyl, tridecyl, decyl or 2-ethylbutyl, or 2-dodecylthioethyl;
 1.4 2-hydroxyethyl, 2-hydroxypropyl, 3-hydroxy-2,2-dimethylprop-1-yl, 8-hydroxy-8-methylnon-2-yl or 4-hydroxybut-2-yl;
 1.5 2,3-dimethyl-4-stearoyloxybut-1-yl or -2-yl, 3-stearoyloxy-2,2-dimethylprop-1-yl, 2-(3'-heptanoyloxy)-2-methylnon-8-yl, 2-stearoyloxy-2-non-8-yl, 4-(3'-heptanoyloxy)-but-2-yl, 4-stearoyloxybut-1-yl, 4-butanoyloxybut-2-yl, 4-(2'-butanoyloxy)-but-2-yl, 8-butanoyloxy-8-methylnon-2-yl, 8-(2'- butanoyloxy)-8-methylnon-2-yl, 4-acryloyloxybut-1-yl, 4-methacryloyloxybut-1-yl, 2,3-dimethyl-4-acryloyloxybut-1-yl or 2,3-dimethyl-4-methacryloyloxybut-1-yl;

1.6 3-cyanoprop-2-yl, 3-cyano-2-methylprop-1-yl, 1-cyanocyclohexyl or 3-cyano-2-methylprop-2-yl;

1.7 2-cyclohexylethyl, cyclohexylmethyl, biscyclooctylmethyl, adamantylmethyl, adamantylethyl or norbornylmethyl;

1.8 2-furanylmethyl, 2-thiophenylmethyl, 2'-pyridyleth-yl-2-yl or 2-pyridylmethyl;

2. Examples of suitable cycloaliphatic radicals are:

2.1 2,6-diisopropylcyclohexyl, 2,6-dimethylcyclohexyl, 3,3,5- and 2,4,6-trimethylcyclohexyl, 2,6-bis-trifluoromethylcyclohexyl, 1-carboethoxycyclohex-1-yl, 1-carbomethoxycyclohex-1-yl, 4-isopropylcyclohexyl, 4-methylcyclohexyl, cyclooctyl or 2,8-diisopropylcyclooctyl;

2.2 bicyclo[2.2.2.]octyl, dicyclopentadienyl, tricyclo[0.2.10]decyl, adamantyl, pinanyl, norbornyl, bornyl or decahydroanthr-10-yl.

3. Examples of suitable aromatic and heterocyclic radicals are:

3.1 phenyl and radicals of the formula (III) which are derived from aniline: 2-methylphenyl, 2,3-, 2,4-, 2,5-, 2,6- or 3,5-dimethylphenyl, 2,4,6-trimethylphenyl, 2-methyl-5-chlorophenyl, 2-methyl-4-chlorophenyl, 2-methyl-4-methoxyphenyl, 2,5-dimethyl-4-methoxyphenyl, 2-methyl-4-methoxy-5-chlorophenyl, 2-methyl-5-(dimethylsulfamyl)-phenyl, 2-ethylphenyl, 2,6-diethylphenyl, 2,6-diethyl-4-methylphenyl, 2-isopropylphenyl, 2,4-, 2,5- and 2,6-diisopropylphenyl, 2-n-butylphenyl, 2-sec-butylphenyl, 2-n-pentylphenyl, 2-n-hexylphenyl, 2-(2'-methylphenyl)-phenyl, 2-n-octylphenyl, 2-methoxyphenyl, 2-ethoxyphenyl, 2,5-dimethoxyphenyl, 2,5-diethoxyphenyl, 2,4-dimethoxyphenyl, 2,4-dimethyl-5-chlorophenyl, 2,4-diethoxyphenyl, 2,3-dimethoxyphenyl, 2,3-diethoxyphenyl, 2,3-methylenedioxyphenyl, 2-methoxy-5-acetylaminophenyl, 2-methoxy-4-acetylaminophenyl, 2-methoxy-5-chlorophenyl, 2-methoxy-5-chlorophenyl, 2-methoxy-5-(N-phenylcarbamoyl)-phenyl, 2-methyl-5-(4'-methoxybenzoyl)-aminophenyl, 2-phenylphenyl, 2-phenylsulfonylphenyl, 2-chlorophenyl; 2,3-, 2,4-, 2,5- or 2,6-dichlorophenyl, 2,4,5- or 2,4,6-trichlorophenyl, 2-bromophenyl, 2,5-dichloro-4-benzoylamino-phenyl, 2,5-dichloro-4-propionylaminophenyl, 2-chloro-4-N-methylsulfamoylphenyl, 2-chloro-4-sulfopyrrolididophenyl, 2,5-dichloro-4-N,N-dimethylsulfamylphenyl, 2-chloro-4-methoxyphenyl, 2-chloro-4-ethoxyphenyl, 4-methoxyphenyl, 4-ethoxyphenyl, 2-tert-butylphenyl or 2,4- or 2,5-di-tert-butylphenyl;

3.2 radicals of the formulae (IVa), (IVb) and (V) which are derived from 1-naphthylamine or 8-aminoquinoline, e.g. naphth-1-yl, 5,6,7,8-tetrahydronaphth-1-yl or quinol-8-yl.

3.3 Pyrazol-5-yl radicals of the formula (VI): 1-methylpyrazol-5-yl, 1-ethylpyrazol-5-yl, 1-n-butylpyrazol-5-yl, 1-(2'-ethylhexyl)-pyrazol-5-yl, 1-phenylpyrazol-5-yl, 1-(4'-chlorophenyl)-pyrazol-5-yl, 1-phenyl-3-methylpyrazol-5-yl, 1-(4'-chlorophenyl)-3-methylpyrazol-5-yl, 1-benzylpyrazol-5-yl, 1-(2'-phenylpropyl)-pyrazol-5-yl, 1-(2'-chlorobenzyl)-pyrazol-5-yl, 1-(2',6'-dichlorobenzyl)-pyrazol-5-yl, 1-(2',3'-dimethylbenzyl)-pyrazol-5-yl, 1-(2'-methoxybenzyl)-pyrazol-5-yl or 1-(furfur-2-yl)-pyrazol-5-yl, and 3.4 Benzoisothiazol-3-yl.

Preferred radicals among those stated for $R^1$ and $R^2$ are those which are not substituted by bromine.

Particularly preferred radicals $R^1$ and $R^2$ are phenyl radicals which are monosubstituted or, in particular, disubstituted in the ortho position, for example by $C_1$–$C_5$-alkyl and/or chlorine and neopentyl.

Specific examples of preferred radicals $R^1$ and $R^2$ are: neopentyl, 2-methylphenyl, 2,3-, 2,4-, 2,5- or 2,6-dimethylphenyl, 2,4,6-trimethylphenyl, 2-ethylphenyl, 2,6-diethylphenyl, 2-isopropylphenyl, 2,4-, 2,5- or 2,6-diisopropylphenyl, 2-tert-butylphenyl, 2,4- or 2,5-ditertbutylphenyl, 2-methoxyphenyl, 2-chlorophenyl, 2,4-, 2,5- or 2,6-dichlorophenyl, 2-phenylsulfophenyl, 2,5-dichloro-4-benzoylaminophenyl, 2-chloro-4N-methylsulfamylphenyl or 2,5-dichloro-4-N,N-dimethylsulfamylphenyl.

X, Y and Z are each preferably chlorine or a radical $OR^3$, where $R^3$ is, in particular, phenyl which is unsubstituted or substituted by cyano, nitro, halogen and/or alkyl of 1 to 18 carbon atoms, or naphthyl or anthryl.

Specific examples of $R^3$ are: phenyl, 2-, 3- or 4-fluorophenyl, 2-, 3- or 4-chlorophenyl, 2-, 3- or 4-bromophenyl, 2-, 3- or 4-tert.-butylphenyl, 2-phenylphenyl, 2-isopropyl-4-methylphenyl, 2,3-, 2,4-, 2,5- or 2,6-dichlorophenyl, 2,4,5- or 2,4,6-trichlorophenyl, 2-, 3- or 4-methylphenyl, 2,3-, 2,4-, 2,5-, 2,6- or 3,5-dimethylphenyl, 2,5,6-trimethylphenyl, 2-methyl-4-chlorophenyl, 2-methyl-5-chlorophenyl, 2-methyl-6-chlorophenyl, 2-ethylphenyl, 2,6-diethylphenyl, 2,6-diethyl-4-methylphenyl, 2-isopropylphenyl, 4-n-dodecylphenyl, 4-chloro-2-nitrophenyl, 4-cyanophenyl-o-nitrophenyl, 2-chloro-5-nitrophenyl, 3-methyl-4-chlorophenyl, 2-methyl-4-nitrophenyl, 3-methyl-4-nitrophenyl, 4-methyl-2-nitrophenyl, 2-cyclohexyl-4-methylphenyl, 2-cyclohexylphenyl, 4-cyclohexylphenyl, 2-, 3- and 4-benzylphenyl, 2-benzyl-4-chlorophenyl, 4-n-propylphenyl or 4-n-butylphenyl.

Because of the particularly advantageous performance characteristics, especially preferred compounds of the formula II are those in which $R^1$ is a 2-monosubstituted or 2,6-disubstituted phenyl radical, such as 2,6-diisopropylphenyl, 2,6-dimethylphenyl, 2,4,6-trimethylphenyl, 2,6-diethylphenyl, 2,4-diisopropylphenyl, 2,6-dimethyl-4-octylphenyl, 2,6-dimethyl-4-tridecylphenyl, 2,6-bistrifluoromethylphenyl, naphth-1-yl, anthr-9-yl, 9-(2',6'-diisopropylphenyl)-anthr-10-yl, 2-tert-butylphenyl, 2,4- or 2,5-di-tert-butylphenyl or alkyl radicals such as neopentyl, octyl, butyl, 2-heptyl, 2-ethylhex-1-yl, 4-(stearoyloxy)-but-2-yl or 4-(stearoyloxy)-but-1-yl, X is chlorine or $-OR^3$ and $R^3$ has the above meanings.

The compounds of the formulae I and II can be prepared by conventional processes, for example by first halogenating perylene-3,4,9,10-tetracarboxylic anhydride to give the tetrahaloperylene-3,4,9,10-tetracarboxylic anhydride. By subsequently reacting this product with amines of the formulae $R^1$—$NH_2$ and $R^2$—$NH_2$, it is possible to obtain substituted tetrahaloperylimides which, when the halogen atoms are exchanged using compounds of the formula $R^3$—OH, give compounds of the formulae (I) and (II).

A particularly preferred halogenating agent is chlorine. The advantage of the preparation route described above over the preparation described in German Laid-Open Application DOS 3,235,526 is that it is possible to obtain tetrachloroperylimides which are chlorinated at defined positions in the perylene nucleus and can then be converted to the aryloxyperylimides of the formulae (I) and (II). This is also the case when the substituents $R^1$ and $R^2$ can be chlorinated. In the preparation route described in German Laid-Open Application DOS 3,235,526, perylimides containing chlorinatable radicals $R^1$ and $R^2$ would undergo a chlorination reaction to give polychloroperylimides chlorinated at undefined positions.

Where necessary, the products are also purified and, if required, separated into their components, for example by fractional precipitation from concentrated sulfuric acid, by recrystallization from high boiling, readily removable solvents or by boiling with solvents under milling conditions. Purification may also be effected by chromatographic separation methods under atmospheric or superatmospheric pressure.

If necessary, the purification process was repeated once or several times. It is also possible to combine different purification methods in order to obtain very pure compounds (I) or (II).

The novel compounds are used as a rule by incorporating them into plastics suitable for the particular application. To do this, the plastic, in the form of granules, is dusted with the required amount of (I), and the granules are then extruded to give sheet-like structures. Incorporation into the plastic may also be effected by diffusion of the required amount of (I) into the plastic or by addition of the required amount of (I) to the monomer of the plastic, followed by polymerization to give the plastic.

Preferred plastics (media) for concentrating light for solar cells are polymethyl methacrylate, polymethyl acrylate, polystyrene and polydiethylene glycol diallyl bicarbonate, as well as suitable nylons and polycarbonates.

Because they are readily soluble in organic solvents, the compounds may also be used when the plastic sheets are produced by casting.

The light collection systems can be used, for example, in conjunction with solar cells for utilizing solar energy and in conventional scintillators [see, for example, J. B. Birks: The Theory and Practice of Scintillation Counting, Pergamon Press, London 1964; J. Opt. Am. 39 (1949), 912; J. Appl. Phys. 40 (1969), 3544; Nuclear Instruments and Methods 87 (1970), 111 to 123; Research Disclosure, p. 43 (1977) and German Laid-Open Application DOS 2,629,641]. They are also useful, in conjunction with electronic controls, as display devices having a very low energy consumption. Furthermore, they are suitable, in the absence of electronic components, for a large number of display, indication and marking purposes, for example in passive display elements, signs and traffic signs, such as traffic lights, and in drawing instruments.

The novel compounds may furthermore be used as laser dyes.

The Examples which follow illustrate the invention. Parts and percentages are by weight.

EXAMPLE 1

169.6 parts of 1,6,7,12-tetrachloro-N,N'-2,6-diisopropylphenylperylene-3,4,9,10-tetracarboxylic acid diimide and 71.4 parts of sodium phenolate are introduced into 1,000 parts of N-methylpyrrolidone, after which stirring is continued for 0.5 hour at room temperature and the mixture is then heated at 40° C. for 14 hours. After filtration, the reaction mixture is poured into water and filtered, and the residue is washed with dilute hydrochloric acid and water and ddried. Recrystallization from ethanol gives 120 parts of the fluorescent dye of the formula

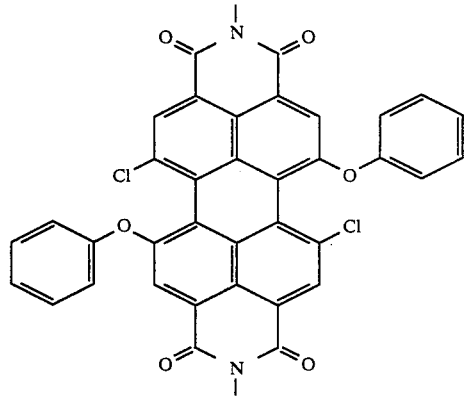

M.P.: 266° C.
λmax absorption: 566 nm (in CHCl₃).
λmax emission: 605 nm (in CHCl₃).
Φ=0.99 (in CHCl₃).

The 1,6,7,12-tetrachloroperylene-3,4,9,10-tetracarboxylic acid required as a starting material for 1,6,7,12-tetrachloro-N,N'-2,6-diisopropylphenylperylene-3,4,9,10-tetracarboxylic acid diimide can be prepared by the method stated in German Pat. No. 412,122.

EXAMPLE 2

67.8 parts of 1,6,7,12-tetrachloro-N,N'-2,6-diisopropylphenylperylene-3,4,9,10-tetracarboxylic acid diimide, 31.7 parts of phenol and 33.1 parts of milled potassium carbonate are introduced into 900 parts of N-methylpyrrolidone under a nitrogen atmosphere. The mixture is stirred for 2 hours at 110° C., cooled and then filtered over quartz sand at 40°-50° C. The dye is precipitated from the reaction solution with a glacial acetic acid/ethanol/water mixture. The product is filtered off, washed neutral with water and dried at 80° C. under reduced pressure to give 78 parts of the fluorescent dye of the formula

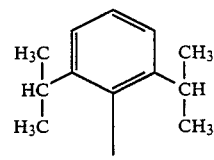

-continued

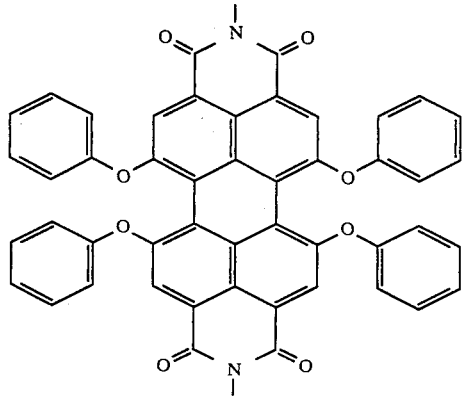

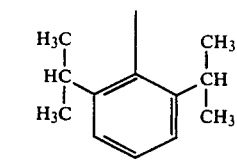

chloroperylimides A are reacted with the phenols B to give the tetraaryloxyperylimides C.

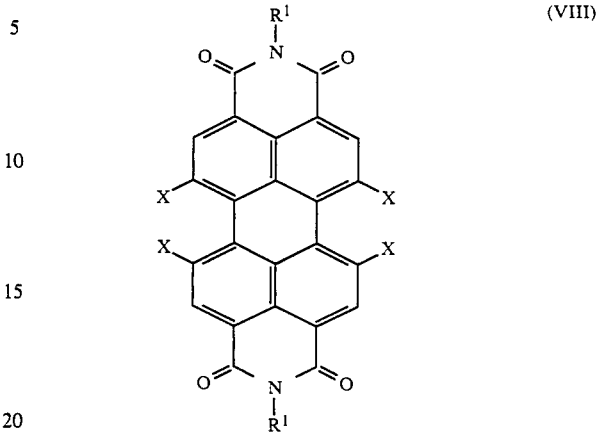

| Ex. | A Formula (VIII) R¹ | X | B | C Formula (VIII) R¹ | X | m.p. of C | λmax extinction of C in CHCl₃ [nm] | λmax emission of C in CHCl₃ [nm] | φ |
|---|---|---|---|---|---|---|---|---|---|
| 3 | H₃C–CH(CH₃)–...–CH(CH₃) (2,6-diisopropylphenyl) | Cl | HO–C₆H₄–Br | same | O–C₆H₄–Br | >300° C. | 572 | 607 | 1.0 |
| 4 | " | Cl | 2-Cl-phenol | " | 2-Cl-O-phenyl | >300° C. | 571 | 602 | 0.96 |
| 5 | " | Cl | HO–C₆H₄–F (para) | " | O–C₆H₄–F | >300° C. | 578 | 610 | 1.0 |
| 6 | " | Cl | 2-F-phenol | " | 2-F-O-phenyl | >300° C. | 572 | 602 | 0.99 |
| 7 | " | Cl | HO–C₆H₄–Cl | " | O–C₆H₄–Cl | >300° C. | 574 | 607 | 0.98 |
| 8 | " | Cl | HO–C₆H₄–C(CH₃)₃ | " | O–C₆H₄–C(CH₃)₃ | >300° C. | 588 | 621 | 1.0 |
| 9 | neopentyl (H₃C–C(CH₃)₂–CH₂–) | Cl | HO–C₆H₅ | same | O–C₆H₅ | >300° C. | 576 | 614 | 1.0 |
| 10 | " | Cl | HO–C₆H₄–C(CH₃)₃ | " | O–C₆H₄–C(CH₃)₃ | >300° C. | 584 | 620 | 0.98 |

M.P.: >300° C.
λmax absorption: 579 nm (in CHCl₃).
λmax emission: 613 nm (in CHCl₃).
Φ=0.96.

In the Examples below, the procedure described in Example 2 is followed, and in each case the tetra-aryloxyperylimides C.

Use Example 1

0.01% of the dye from Example 1 is dissolved in molten polymethyl methacrylate and dispersed to give a homogeneous solution, and the latter is processed to fluorescent sheets.

Use Example 2

1,000 parts of polymethyl methacrylate (granules) are uniformly dusted with 0.01 part of the dye from Example 2. The mixture is then extruded to give sheets.

Use Examples 3 to 25

Fluorescent sheets or films are produced by a method similar to that described in Use Example 1 or 2:

| Use Example | Dye from Example | Material |
|---|---|---|
| 3 | 3 | polymethyl methacrylate |
| 4 | 4 | polymethyl methacrylate |
| 5 | 5 | polymethyl methacrylate |
| 6 | 6 | polymethyl methacrylate |
| 7 | 7 | polymethyl methacrylate |
| 8 | 8 | polymethyl methacrylate |
| 9 | 9 | polymethyl methacrylate |
| 10 | 10 | polymethyl methacrylate |
| 11 | 2 | polyvinyl chloride |
| 12 | 2 | polystyrene |
| 13 | 2 | polycarbonate |
| 14 | 1 | polyethylene |
| 15 | 2 | polyethylene |
| 16 | 4 | polyethylene |
| 17 | 8 | polyethylene |
| 18 | 1 | polyvinyl chloride |
| 19 | 1 | polystyrene |
| 20 | 1 | polycarbonate |
| 21 | 6 | polyethylene |
| 22 | 6 | polyvinyl chloride |

We claim:

1. A compound of the formula

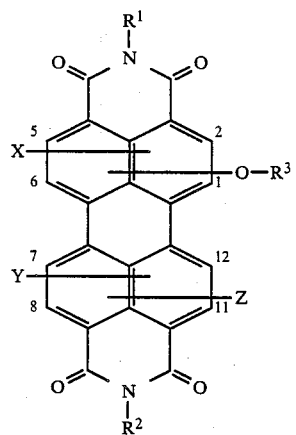

where
$R^1$ and $R^2$ are identical or different $C_1-C_{18}$-alkyls which are unsubstituted or substituted by $C_1-C_{18}$-alkoxy, $C_1-C_{18}$-alkanoyloxy, $C_1-C_{18}$-alkylthio, hydroxyl, phenyl, phenoxy or phenylthio; cyclohexyl which is unsubstituted or substituted by hydroxyl, $C_1-C_5$-alkyl, methoxy, ethoxy, $C_1$- or $C_2$-alkylthio, $C_1-C_{18}$-alkanoyloxy or $C_1-C_{18}$-alkoxycarbonyl; phenyl which is monosubstituted or disubstituted in the ortho-position by $C_1-C_5$-alkyl or chlorine or by $C_1-C_5$-alkyl and chlorine; or naphthyl; X, Y and Z are each chlorine, bromine or $-OR^3$, and $R^3$ is unsubstituted phenyl, or phenyl substituted by cyano, halogen, nitro, $C_1-C_{18}$-alkyl or a mixture thereof, or naphthyl or anthryl, and wherein X, Y, Z and $OR^3$ are in the 1, 6, 7 and 12 position.

2. A compound as claimed in claim 1, of the formula

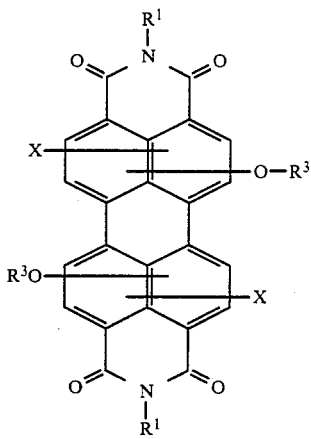

where
$R^1$ and $R^3$ have the meanings stated in claim 1 and
X is chlorine or $OR^3$.

3. A compound as claimed in claim 2, wherein X and $-OR^3$ are in the 1, 6, 7 and 12 positions.

4. A compound of the formula

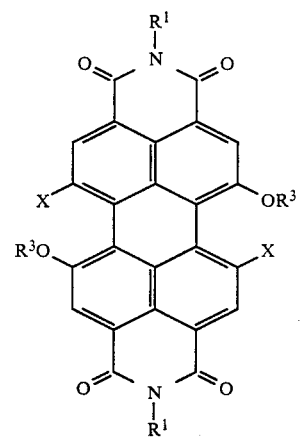

where $R^1$ is phenyl which is monosubstitut4ed or disubstituted in the ortho position by $C_1-C_5$-alkyl or chlorine, the substituents being identical or different where there are two of them,
X is chlorine or $OR^3$ and
$R^3$ is phenyl which is unsubstituted or substituted by cyano, nitro, halogen or $C_1-C_8$-alkyl, or is naphthyl or anthryl.

5. A compound as claimed in claim 4, wherein X is $OR^3$.

6. A compound of the formula

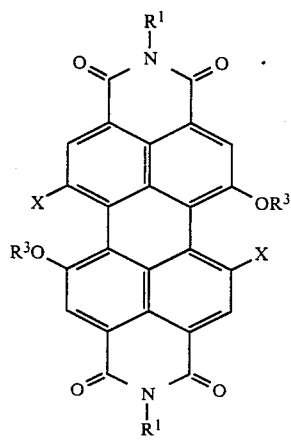

where
R¹ is 2,6-diisopropyl phenyl, 2,6-dimethylphenyl, 2,4,6-trimethylphenyl, 2,6-diethylphenyl, 2,4-diisopropylphenyl, 2,6-dimethyl-4-octylphenyl, 2,6-dimethyl-4-tridecylphenyl, 2,6-bistrifluoromethylphenyl, naphth-1-yl, anthr-9-yl, 9-(2',6'-diisopropylphenyl)-anthr-10-yl, 2-tert-butylphenyl, 2,4-di-tert-butylphenyl, 2,5-di-tert-butylphenyl, neopentyl, octyl, butyl, 2-heptyl, 2-ethylhex-1-yl, 4-(stearoyloxy)-but-2-yl or 4-(stearoyloxy)-but-1-yl, X is chlorine or —OR³ and
R³ is phenyl which is unsubstituted or substituted by bromine, chlorine, fluorine or $C_1$–$C_8$-alkyl, or is naphthyl or anthryl.

7. A compound as claimed in claim 6, wherein
R¹ is 2,6-diisopropyl or neopentyl,
X is OR³ and
R³ is phenyl which is unsubstituted or substituted by bromine, chlorine, fluorine or tert-butyl.

* * * * *